(12) United States Patent
Maggard

(10) Patent No.: US 7,287,563 B2
(45) Date of Patent: Oct. 30, 2007

(54) VEHICLE-MOUNTED CUTTING TOOL

(76) Inventor: James Joseph Maggard, 668 Toyon Ave., Sunnyvale, CA (US) 94086

( * ) Notice: Subject to any disclaimer, the term of this patent is extended or adjusted under 35 U.S.C. 154(b) by 280 days.

(21) Appl. No.: 11/123,555

(22) Filed: May 6, 2005

(65) Prior Publication Data

US 2006/0249226 A1     Nov. 9, 2006

(51) Int. Cl.
*A01G 23/087* (2006.01)
(52) U.S. Cl. ................. 144/4.1; 144/34.1; 144/34.5
(58) Field of Classification Search ............ 144/4.1, 144/34.1, 4.5, 4.53; 30/121, 244, 245, 249; 56/10.4, 14.9, 15.2, 15.7
See application file for complete search history.

(56) References Cited

U.S. PATENT DOCUMENTS

| | | | | |
|---|---|---|---|---|
| 396,825 A | * | 1/1889 | Low ..................... 144/34.1 |
| 734,287 A | * | 7/1903 | Vallee ................... 144/34.2 |
| 3,726,326 A | * | 4/1973 | Coleman ............... 144/34.1 |
| 4,151,868 A | * | 5/1979 | Fischer ................. 144/34.1 |
| 4,254,807 A | * | 3/1981 | Tucek ................... 144/34.5 |
| 4,261,400 A | * | 4/1981 | Spence ................. 144/195.1 |

* cited by examiner

*Primary Examiner*—Shelley M Self
(74) *Attorney, Agent, or Firm*—Hovey Williams LLP

(57) ABSTRACT

A vehicle-mounted cutting tool is disclosed. The tool broadly includes a supporting member mounted to a vehicle, a pivotable member pivotally coupled with the supporting member, and a slidable member slidably coupled with the supporting member. Contact with an object, such as a tree, and motion of the vehicle causes the slidable member to slide. Sliding of the slidable member causes the pivotable member to pivot such that it crosses at least a portion of the slidable member to cut the object.

20 Claims, 5 Drawing Sheets

VEHICLE-MOUNTED CUTTING TOOL

BACKGROUND OF THE INVENTION

1. Field of the Invention

The present invention relates to vehicle-mounted cutting tools. More particularly, the invention relates to a vehicle-mounted cutting tool having a pivotable member and a slidable member operable to cut an object, such as a tree, when the slidable member is slid due to contact with the object.

2. Description of the Related Art

Various conventional methods of cutting and harvesting trees have been developed. Such methods include the use of a saw, chainsaw, a plurality of blades, or other personally operated devices. Such devices often malfunction causing serious or deadly injury to their operators. Additionally, personally operated devices require individuals to be in close proximity to trees, thereby increasing the probability that a cut tree will fall on them and cause serious or deadly injury. Furthermore, personally operated devices are inefficient for cutting a plurality of trees due to the time required by the device to sufficiently cut each tree and the need to specifically engage trees on an individual basis by walking and transporting equipment between each tree. As harvesters often desire to cut a large number of trees, such conventional methods are generally unsafe, inefficient, and time-consuming.

Other conventional methods have been developed in an attempt to remedy the problems described above. For example, some conventional methods utilize a pinching blade to hold a tree in place while a rotary blade cuts the tree. After cutting, the pinching blade is released and the tree is allowed to fall to the ground in a controlled manner. However, these methods still require individuals to be in close proximity to cut trees and also require individuals to specifically engage each tree on an individual basis. Thus, these other conventional methods are also generally unsafe, inefficient, and time-consuming.

SUMMARY OF THE INVENTION

The present invention solves the above-described problems and provides a distinct advance in the art of cutting tools. More particularly, the invention provides a vehicle-mounted cutting tool having a pivotable member and a slidable member operable to cut an object in a safe, efficient, and expedient manner when the second slidable member is slid due to contact with the object.

In one embodiment of the present invention, the tool includes a supporting member mounted to a vehicle, a pivotable member pivotally coupled with the supporting member, and a slidable member slidably coupled with the supporting member. The tool is configured such that the slidable member slides when it contacts the object while the vehicle is in motion. The sliding of the slidable member causes the pivotable member to pivot and at least partially cross a portion of the slidable member to cut the object.

In another embodiment, the tool includes a supporting member mounted to a vehicle, a pivotable member pivotally coupled with the supporting member, and a slidable member slidably coupled with the supporting member and also coupled with the pivotable member. The slidable member has a generally arcuate engaging surface for engaging the tree. Forward motion of the vehicle causes the tree to contact the engaging surface, the slidable member to slide due to contact with the tree, and the pivotable member to pivot due to the coupling with the slidable member. The pivoting of the pivotable member causes the pivotable member to at least partially cross a portion of the engaging surface to cut the tree.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
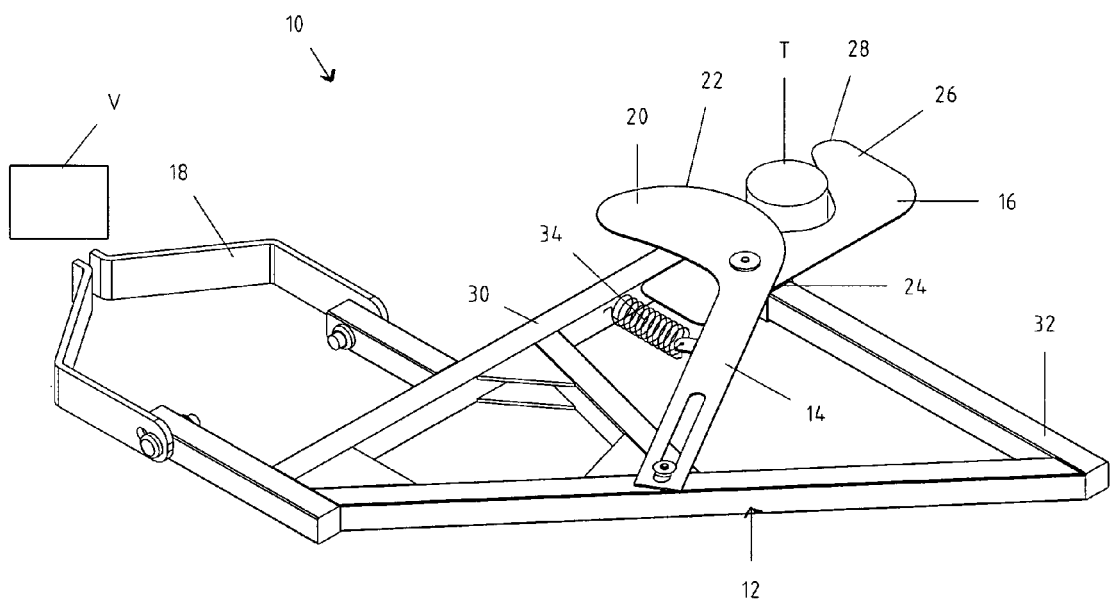
FIG. 1 is a front elevational view of a tool constructed in accordance with the principals of a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, and particularly FIGS. 1-6, a vehicle-mounted cutting tool 10 is shown constructed in accordance with a preferred embodiment of the present invention. The tool 10 broadly includes: a supporting member 12; a pivotable member 14 pivotally coupled with the supporting member 12; and a slidable member 16 slidably coupled with the supporting member 12. As described in detail below, sliding of the slidable member 16 causes the pivotable member 14 to pivot such that it crosses at least a portion of the slidable member 16 to cut an object, such as a tree T.

The tool 10 is operable to mount to a vehicle V. The vehicle V may be any conventional vehicle including machine powered, human powered, and animal powered vehicles. Thus, the vehicle may be a tractor, a truck, a car, a motorized cart, a powered or unpowered lawnmower, a riding or push lawnmower, an animal-driven cart, etc. The more power available to the vehicle V, the generally greater the available cutting power, as the motion of the vehicle is utilized to assist in cutting objects, as described below in detail. Thus, depending on the specific object to be cut, such as a large tree or a small tree, it may be preferable to utilize a particular vehicle, such as using a large powered tractor for cutting large trees or using a riding lawnmower for very small trees.

The tool 10 may be mounted to the vehicle V in any conventional manner, such as by bolting or otherwise securely attaching the tool 10 to the vehicle V, by attaching the tool 10 to the vehicle through any methods such as chains, ropes, etc, and/or by coupling the tool 10 with the vehicle V such that the tool 10 may be pulled or pushed by the vehicle. Preferably, the tool 10 is mounted to the vehicle V utilizing a conventional three-point linkage 18. The three-point linkage 18 enables the tool 10 to be easily and securely mounted to the vehicle V or any other vehicle including a similar conventional three-point linkage. Additionally, the three-point linkage 18 enables the tool 10 to be easily and quickly removed from the vehicle V after use for storage or transport between vehicles.

Additionally, the tool 10 may be mounted to any portion of the vehicle V. However, for safety reasons, it is desirable to mount to the tool 10 to portions of the vehicle V that reduce the probability of a cut object, such as the tree T, striking the vehicle V or its operators. For example, the tool 10 may be mounted to the rear of the vehicle V such that the tree T or other cut objects fall behind the forward moving vehicle V. Similarly, the tool 10 may be mounted offset to the side of the vehicle V such that the tree T or other cut objects fall to the side of the forward moving vehicle.

Preferably, the tool 10 mounts to the vehicle V through the supporting member 12. Thus, the supporting member 12 is preferably operable to mount to the vehicle utilizing the three-point linkage 18 described above. It is preferable to mount the tool 10 to the vehicle V utilizing the supporting member 12 as the supporting member 12 provides a stable and sturdy base for cutting objects, as is described below. However, additional or other portions of the tool 10 may be operable to mount to the vehicle 10 in place of, or in addition to, the supporting member 12.

The supporting member 12 may be of any shape or form operable to enable the functionality described herein. The supporting member 12 as illustrated includes a generally triangular shape to enable the pivotable member 14 and slidable member 16 to extend beyond the sides of the vehicle V. However, the supporting member 12 may include any desired shape or form based on the requirements of the particular embodiment, such as a circle, square, rectangle, or non-uniform shape.

The supporting member 12 may be formed from any material operable to sufficiently support the tool 10. Thus, the supporting member 12 may be formed from rigid plastic such as PVC, metals such as steel or aluminum, etc. Preferably, the supporting member 12 is formed from four inch tubular steel and three-eights inch steel plate gussets placed in appropriate positions for support. For example, the generally triangular shape of the supporting member 12 may be formed by joining three lengths of four inch tubular steel and positioning one or more steel plate gussets at the vertices of the formed triangle. Similar structural configurations may be utilized when the supporting member 12 is non-triangular, such as using tubular steel to form the edges of a square and using steel gussets in each corner of the square for reinforcement.

The pivotable member 14 is pivotally coupled with the supporting member 12. The pivotable member 14 includes a distal end and a proximate end. The proximate end includes a cutting head 20 operable to cut an object such as the tree T. Preferably, the distal end of the pivotable member 14 is coupled with the supporting member 12 such that stresses caused by pivoting and cutting are generally dispersed throughout the pivotable member 14 and supporting member 12. The pivotable member 14 may be coupled with the supporting member 12 utilizing bolts, screws, or any other conventional coupling elements that enable the pivotable member 14 to pivot in the manner described herein.

The pivotable member 14, including the cutting head 20, may be formed from any material operable to generally withstand the forces incurred by the pivotable member 14 when pivoting and cutting. Thus, the pivotable member 14 and cutting head 20 are preferably formed from steel or other similarly resilient material. Additionally, the cutting head 20 is preferably formed from a material which is operable to cut a desired object, such as the tree T. The cutting head 20 includes a cutting edge 22 which is preferably sharpened and/or serrated to facilitate in the cutting of the object. The cutting head 20 and/or cutting edge 22 may be formed from different materials than the remaining portions of the pivotable member 14 or the cutting head 20 and cutting edge 22 may be formed from the same material as the remaining portions of the pivotable member 14.

The cutting head 20 is formed to facilitate cutting the object in an efficient manner, as described below in detail. For example, the cutting head 20 is preferably curved and the cutting edge 22 is preferably arcuate to maximize the application of the cutting edge 22 to the object over a given distance. The curved cutting head 20 also reduces the amount the pivotable member 12 must pivot to sufficiently cut the object.

Figure 2:
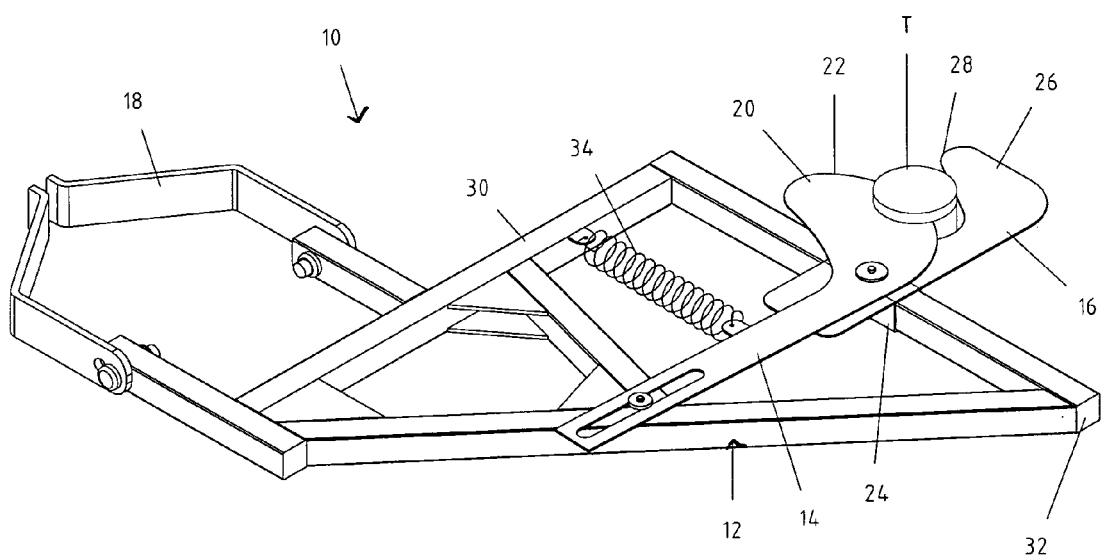
FIG. 2 is a front elevational view of the tool of FIG. 1 illustrating a pivotable member and a slidable member slid rearward due to contact with an object.
Figure 3:
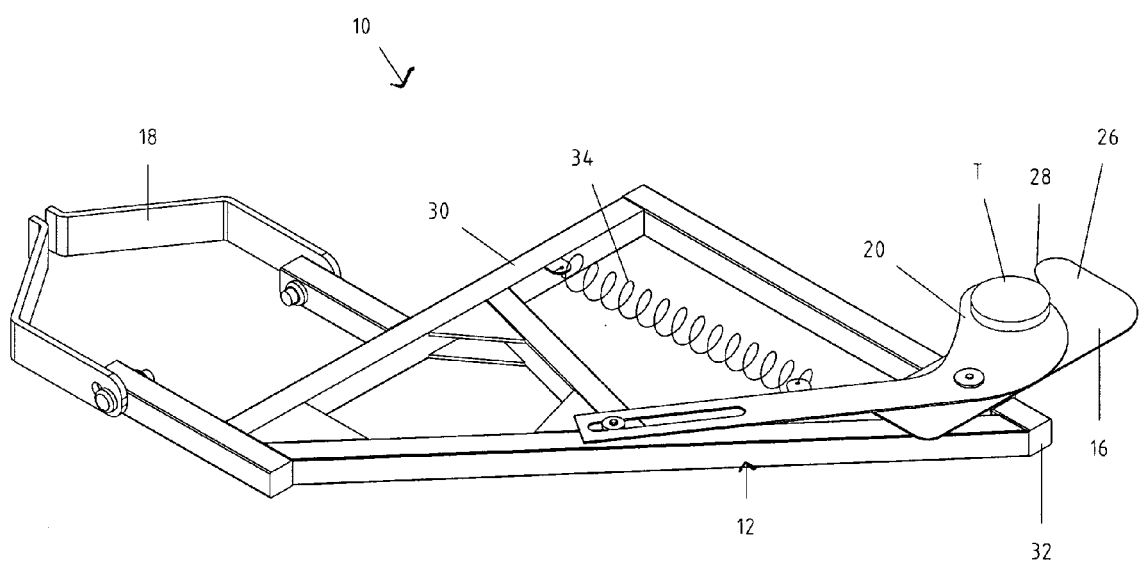
FIG. 3 is a front elevational view of the tool of FIGS. 1 and 2 illustrating the pivotable member and the slidable member slid further rearward due to further contact with the object.

The slidable member 16 is slidably coupled with at least a portion of the supporting member 12 and operable to slide across at least a portion of the supporting member 12. In one embodiment, the slidable member 16 is slidably coupled with at least a portion of one side of the generally triangular supporting member 12 to enable the slidable member 16 to slide along the side of the supporting member 12, as shown in FIGS. 1-3. However, the slidable member 16 may be slidably coupled with any portion of the supporting member 12 and may be operable to slide along any portion of the supporting member 12. It is generally preferable to maximize the distance the slidable member may slide to facilitating cutting and pivoting, as described below in detail.

Figure 4:
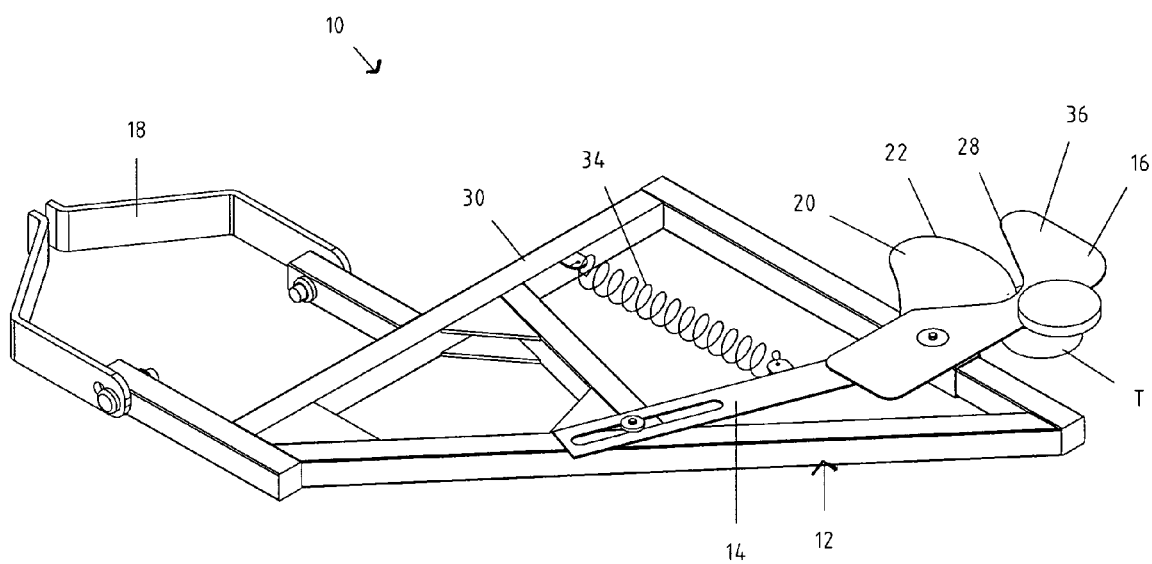
FIG. 4 is a front elevational view of the tool of FIGS. 1-3 illustrating the pivotable member and the slidable member returning forward after cutting the object.
Figure 6:
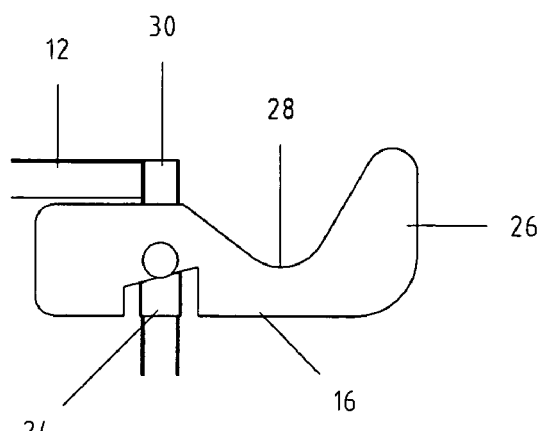
FIG. 6 is a top view of the slidable member utilized by the tool of FIGS. 1-5.
Figure 5:
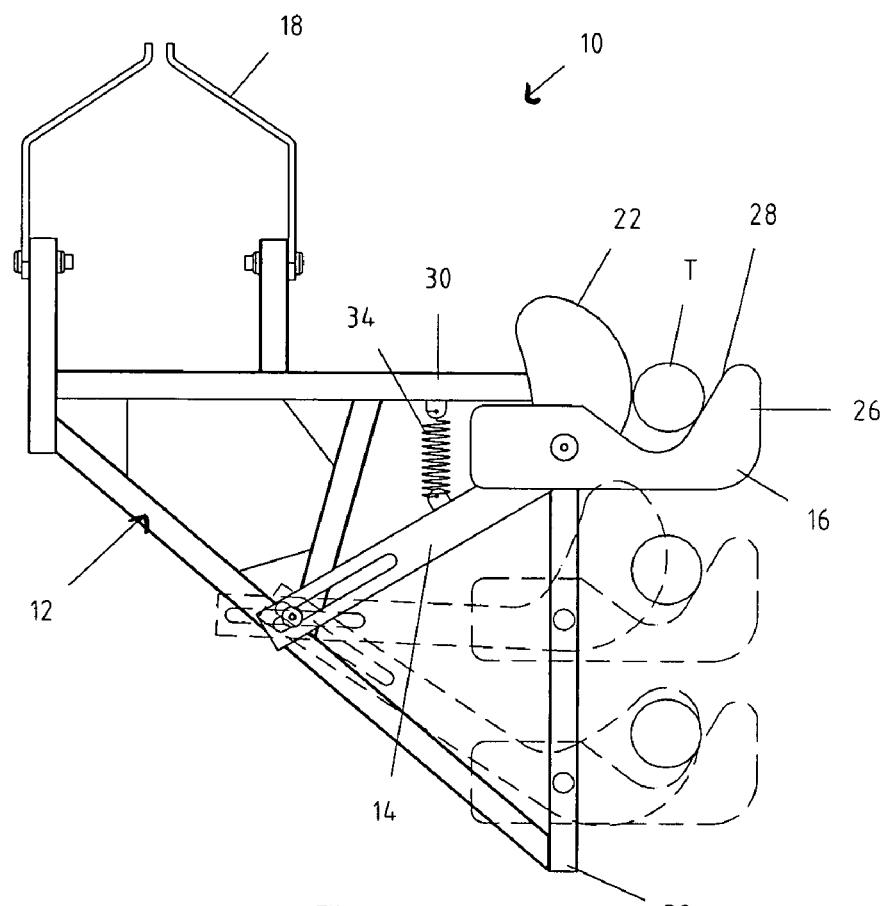
FIG. 5 is a top view of the tool of FIGS. 1-4.

The slidable member 16 preferably includes a sliding element 24 and a cutting element 26 securely coupled with the sliding element 24. The sliding element 24 is formed to securely couple in a slidable manner with the supporting member 12. For example, in embodiment where the supporting member 12 is comprised of a plurality square-shaped tubular sections, the sliding element may be similarly square shaped to fit around the square-shaped sections, as shown in FIG. 4. Alternatively, the sliding element 24 may have other shapes or forms, such as a circular shape to fit around a circular supporting member, a triangular shape for fit around a triangular member, etc. Preferably, the sliding element 24 envelopes a sufficient portion of the supporting member 12 to enable the sliding element 24, and any other elements coupled with the sliding element 24 such as the cutting element 26, to be securely coupled with the supporting element 12 such that the slidable member 16 is prevented from inadvertently detaching from the supporting element 12.

The slidable member 16, including the sliding element 24 and the cutting element 26, is preferably formed from a resilient material, such as those materials described above, which is able to withstand the various forces incurred due to sliding and cutting. Thus, the slidable member 16 may be formed from plastic such as PVC or metals such as steel or aluminum. The cutting element 26 may be conventionally coupled with the sliding element 24 through welding, bolts, screws, etc. Alternatively, the cutting element 26 and the sliding element 24 may be integral such that the cutting element 26 and the sliding element 24 are formed from the same material.

Preferably, the cutting element 26 includes an engaging surface 28 for engaging an object to be cut. The engaging surface 28 is preferably sharp or serrated to enable the engaging surface 28 to at least partially cut the object. Additionally, the engaging surface 28 is preferably sharp to assist the cutting element 26 in passing over a cut tree stump or other object. In various embodiments, the tool 10 is operable to cut a tree T and the engaging surface 28 is operable to engage the tree T such that at least a portion of the tree T remains in contact with the engaging surface 28 and slidable member 16 throughout the forward-movement of the vehicle V until the tree T is cut as described below. Thus, the engaging surface 28 facilitates cutting the tree T by favorably positioning the tree T such that it may be cut by the pivotable member 14 and/or the slidable member 16.

The engaging surface 28 is preferably generally arcuate to correspond to the generally circular shape of a tree trunk. The arcuate shape of the engaging surface 28 enables the tree T to be securely received by the engaging surface 28 during forward motion of the vehicle V such that the tree T is held in position while being cut. The arcuate shape of the engaging surface 28 additionally enables the tree T to be guided towards a favorable cutting position near the center of the cutting element 26 such that maximum portions of the cutting head 20 and engaging surface 28 contact the tree T for cutting.

As shown in FIGS. 1-4, the slidable member 16 is operable to slide from a proximate end 30 of the supporting member 12 to a distal end 32 of the supporting member 12. The sliding of the slidable member 16 is actuated by contact with an object, such as the tree T, and the forward-motion, or other motion, of the vehicle V. In some embodiments, the slidable member 16 is slid towards the distal end 32 of the supporting member 12 when the vehicle V moves forward and at least a portion of the slidable member 16, preferably the engaging surface 28, engages the object. The slidable member 16 is operable to slide towards the distal end 32 of the supporting member 12 until its motion is blocked, either by termination of the supporting member 12, by a stop, or other similar method of blocking the path of the slidable supporting member. However, due to the pivoting of the pivotable member 14 described below, an object is desirably bisected and/or felled before forcing the slidable member 16 to be blocked by the distal end 32 of the supporting member 12.

The sliding of the slidable member 16 towards the distal end 32 of the supporting member 12 causes the pivotable member 14 to pivot towards the distal end 32 of the supporting member. As shown in FIGS. 1-3, in some embodiments the pivotable member 14 is directly coupled with the slidable member 16 such that the sliding of the slidable member 16 directly causes the pivotable member 14 to pivot. In other embodiments, the pivotable member 14 is not directly coupled with the slidable member 16 and instead the pivotable member 14 may be coupled with a gear system, including a gear rack and a cog, to pivot the pivotable member 14 when the slidable member 16 is slid. For example, the slidable member 16 may be associated with a gear rack and the pivotable member 14 may be associated with a cog such that the sliding of the slidable member 16 causes the gear rack to rotate the cog and pivot the pivotable member 14. Furthermore, the pivoting of the pivotable member 12 and/or sliding of the slidable member 16 may be facilitated or actuated by powered methods, such as motors, hydraulics, and/or electric devices. For example, in some embodiments, one or more generally conventional hydraulic elements may be operably coupled with the pivotable member 14 to power the pivoting of the pivotable member 14 upon activation by the sliding of the slidable member 16 or through other activation means such as contact switches or other sensors.

The pivotable member 14 crosses at least a portion of the slidable member 16 when the pivotable member 14 pivots towards the distal end 32 of the supporting member 12. The crossing of the pivotable member 14 and at least a portion of the slidable member 16 cuts the object. Preferably, the pivotable member 14 crosses at least a portion of the engaging surface 28 to cut the object. Additionally, the pivotable member 14 desirably crosses a substantial portion of the engaging surface 28 to bisect the object before the slidable member 16 reaches the distal end 32 of the supporting member 12 such that the object is bisected and/or felled before the pivoting of the pivotable member 14 is halted.

As shown in FIGS. 1-4, the pivotable member 14 does not preferably cross a substantial portion of the engaging surface 28 when the slidable member 16 has not been slid towards the distal end 32 of the supporting member 12. Such configuration is preferable as it enables an object, such as the tree T, to be received by the engaging surface 28 without being obstructed by the pivotable member 14. The shape of the cutting head 20 also facilitates this configuration as described below.

Contact with the object and the forward motion of the vehicle V causes the slidable member 16 to slide towards the distal end 32 of the supporting member 12 and pivot the pivotable member 14. As the pivotable member 14 pivots, the cutting head 20 moves towards the engaging surface 28 to contact and cut the object. As the pivotable member 14 pivots further, due to the forward-motion of the vehicle V, the cutting head 20 moves further towards the engaging surface 28 and further cuts into the object. If forward-motion is not further applied, the cutting head 20 will not move further towards the engaging surface 28 and the object will not be further cut. Eventually as additional forward-motion is achieved by the vehicle V, the cutting head 20 will cross at least a portion of the engaging surface 28 and cut through the object to sever the object into two pieces. Preferably, the cutting head 20 crosses a substantial portion of the engaging surface 28 such that any object retained therein, such as the tree T, will be bisected. Thus, the forward-motion of the vehicle V provides the force necessary to cut the object by forcing the slidable member 16 against the object which results in the pivoting of the pivotable member 14.

It will be appreciated that an object, such as the tree T, may be felled without being completely bisected. For example, a tree may fall when only a portion of its trunk is cut due to the shifting weight of the tree and the loss of support caused by the missing portion. Thus, the tool 10 may cut and fell a tree by cutting only a portion of the tree's trunk such that the trunk need not be completely bisected. In such a situation, the tool 10 operates in the same manner as described herein with the exception that the cutting head 20 need not completely bisect the object.

Additionally, the slidable member 16 preferably facilitates in the cutting of the object by being forced against the object due to the forward motion of the vehicle V. Thus, the engaging surface 28 or other portion of the slidable member 16 may include a sharp or serrated edge to facilitate in cutting. Furthermore, the crossing of the pivotable member 14 and the slidable member 16, such as the crossing of the cutting head 20 and engaging surface 28, creates a scissor-like action that cuts the object from both sides. Preferably, the pivoting of the pivotable member 16 and sliding of the slidable member 16 cuts the object, such as the tree T, by slicing. However, in other embodiments, the tool 10 may cut the object by shearing.

However, it will be appreciated that in some embodiments the pivotable member 14 may be the primary cutting member responsible for a majority of the cutting and the slidable member 16 may be a secondary cutting member responsible for a minority of the cutting. Similarly, in other embodiments the pivotable member 14 may provide no or limited cutting while the slidable member 16 is responsible for all or a majority of the cutting. In such embodiments the pivotable member 14 forces the object against the slidable member 16 for cutting.

Furthermore, the shape of the cutting head 20 facilitates in the cutting of the object by providing the cutting edge 22 with maximum contact with the object. As described above and shown in FIGS. 1-3, the cutting head 20 has a generally curved shaped such that the cutting edge 22 is generally arcuate. The arcuate cutting edge 22 and curved cutting head 20 enable the cut object to be substantially bisected while minimizing the amount of pivoting required by the pivotable member 14 and thereby reducing the overall length and size of the tool 10. For example, the amount of pivoting required by the pivotable member 14 is reduced due to the curved cutting head 20 and arcuate cutting edge 22. Additionally, the curved cutting head 20 and arcuate cutting edge 22 enable the engaging surface 28 to be generally unobstructed when the slidable member 16 is in proximity to the proximate end 30 of the supporting member 12 and enable the engaging surface 28 to be substantially crossed when the slidable member 16 is in proximity to the distal end 32 of the supporting member 12.

The tool 10 additionally includes a resistive element 34 operable to resist the movement of the slidable member 16 towards the distal end of the supporting member 12. The resistive element 34 is preferably a tension spring or other similar element, such as a motor, operable to resist movement and/or provide force. The resistive element 34 prevents the slidable member 16 from inadvertently sliding towards the distal end 32 of the supporting member 12. Prohibiting inadvertent sliding of the slidable member 16 is preferable as it prevents the engaging surface 28 from being obstructing by the cutting head 20 and reduces the probability of accidental cutting. Similarly, as the pivotable member 12 is preferably coupled with the slidable member 16, the resistive element 34 prevents the inadvertent pivoting of the pivotable member 12.

The resistive element 34 additionally returns the slidable member 16 and pivotable member 12 towards the proximate end 30 of the supporting member 12 once the object is bisected and/or felled. Specifically, the slidable member 12 is slid towards the distal end 32 of the supporting member 12 due to contact with the object and motion of the vehicle V. Once the object is bisected and/or felled, the object no longer contacts the slidable member 12 and no longer slides the slidable member 16 towards the distal end 32 of the supporting member 12. Upon removal of this force, the resistive element 34 is operable to pull or otherwise return the slidable member 16 and coupled pivotable member 14 towards the proximate end 30 of the supporting member 12. Such functionality enables multiple objects to be sequentially cut and felled, such as a plurality of trees, as the return of the members 14, 16 towards the proximate end 30 of the supporting member 12 unobstructs the engaging surface 28 such that an additional object may be received and cut therein while forward-motion of the vehicle V remains continuous.

In some embodiments, the resistive element 34 may be a pull or push air cylinder which is operable to provide the desired resistance and return functionality as described above. Such an embodiment that utilizes one or more air cylinders may be desirable due to the additional force generally provided by air cylinders in comparison to conventional compression springs to enable the slidable member 16 to return towards the proximate end 30 of the supporting member 12 more rapidly.

The tool 10 may further include a push bar operable to push a cut object away from the vehicle V. For example, the push bar may be a spring-biased bar that is coupled with the supporting member 12 to push against an object, such as the tree T, which contacts the slidable member 16 and/or engaging surface 28. The push bar may be mounted in any configuration with the tool 10 to enable objects to be pushed in any direction from the tool 10. For instance, in embodiments where the tool 10 is mounted behind the vehicle V the push bar may apply force to push the object towards the distal end 32 of the supporting member 12 such that the object falls away from the vehicle. Similarly, in embodiments where the tool 10 is mounted to the side of the vehicle, the push bar may apply force to push the object further to the side or rearward of the vehicle V to prevent the vehicle from being stuck by the cut object.

The tool 10 may be of any size operable to perform a desired cutting function. In embodiments where the tool 10 is utilized to cut trees, it is desirable for the pivotable member 14 to include a length between approximately one foot and eight feet, the slidable member 14 to include a length between approximately three inches and four feet, and the supporting member to include a length from the proximate end 30 to the distal end 32 of between approximately two feet and eight feet.

In operation, a user mounts the tool 10 the vehicle V as described above. The user maneuvers the vehicle V towards a desired object, such as the tree T and aligns the vehicle V with the object. The user aligns the object with the slidable member 16, preferably the engaging surface 28, and drives the vehicle forward. The forward-motion of the vehicle causes the object to contact the slidable member 16, preferably including the engaging surface 28, to thereby slide the slidable member 16 towards the distal end 32 of the supporting member 12. As the slidable cutting head 16 is slid towards the distal end 32 of the supporting member 12, the pivotable member 14 pivots toward the distal end 32 of the supporting member 12 to contact and cut the object. The power of the vehicle V enables the vehicle V to drive further forward, even against the force of the object, to thereby drive the pivotable member 14 further into the object, eventually resulting in the bisection or felling of the object. Upon cutting through the object the force applied against the slidable member 16 by the object is eliminated and the resistive element 34 returns the members 14, 16 towards the proximate end 30 of the supporting member 12 to enable another object to be cut without stopping or redirecting the vehicle V. Thus a plurality of objects may be cut by continuous forward-motion of the vehicle V. The position of the tool 10 in relation to the vehicle V, such as being mounted behind the vehicle V or offset from the vehicle V, enables the object to be cut without it falling upon the vehicle V or its operators.

In the situation where the user attempts to cut a object which is too large to be cut, or in situations where user begins to inadvertently cut an object, the user may simply direct the vehicle to travel backwards thereby easily disengaging the object and allowing the cutting elements 14, 16 to return towards the distal end 32 of the supporting member 12 due to the resistive element 34. Upon disengaging the object, the user may maneuver to a second object and cut the second object as described above, without being required to adjust or otherwise reset the tool 10 or stop the vehicle V.

The user may utilize the tool 10 to sequentially cut a plurality of objects, such as a plurality of trees, simply by aligning the slidable member 16 with each object and driving the vehicle forward. Thus, the tool 10 may be easily utilized to harvest the plurality of objects, such as the plurality of trees, in a safe, expedient, and efficient manner without requiring the user to manually cut each object or to adjust or configure the tool 10 for each cutting. For example, the user may cut a first tree as described above, after which the resistive element 34 will return the members 14, 16 towards the proximate end 30 of the supporting member 12, and then cut a second tree in a similar manner to the first tree, and so on. As the tool 10 may be easily mounted to a variety of vehicles, including trucks, carts, and tractors, an object such as a tree may be cut and immediately placed in the truck, or other similar vehicle, by the user or a second user without stopping the vehicle V. Such functionality further facilitates the harvesting of a plurality of objects in an safe expedient and efficient manner.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A vehicle-mounted tool for cutting an object, the tool comprising:
    a supporting member for mounting to a vehicle, the supporting member having a proximate end and a distal end;
    a pivotable member pivotally coupled with the supporting member; and
    a slidable member slidably coupled with the supporting member, wherein contact with the object and motion of the vehicle causes the slidable member to slide towards the distal end of the supporting member and the pivotable member to pivot towards the distal end of the supporting member and at least partially cross a portion of the slidable member to cut the object.

2. The tool of claim 1, wherein forward-motion of the vehicle causes the object to contact the slidable member and slide the slidable member towards the distal end of the supporting member.

3. The tool of claim 1, wherein the slidable member includes an engaging surface for engaging the object.

4. The tool of claim 3, wherein the sliding of the slidable member towards the distal end of the supporting member causes the pivotable member to pivot towards the distal end of the supporting member and at least partially cross at least a portion of the engaging surface.

5. The tool of claim 3, wherein the engaging surface is generally arcuate.

6. The tool of claim 3, where in the pivotable member is formed such that it does not cross the engaging surface until the slidable member is slid towards the distal end of the supporting member.

7. The tool of claim 1, further including a resistive element operable to resist the sliding of the slidable member towards the distal end of the supporting member.

8. The tool of claim 7, wherein the resistive element is operable to return the slidable member towards the proximate end of the supporting member.

9. The tool of claim 1, wherein the pivotable member is coupled with the slidable member.

10. The tool of claim 1, wherein the pivotable member includes a sharpened cutting edge to facilitate cutting the object.

11. The tool of claim 1, wherein the supporting member mounts to the vehicle utilizing a three-point linkage.

12. A vehicle-mounted tool for cutting a tree, the tool comprising:
    a supporting member for mounting to a vehicle, the supporting member having a proximate end and a distal end;
    a pivotable member pivotally coupled with the supporting member; and
    a slidable member coupled with the pivotable member and slidably coupled with the support member, the slidable member having a generally arcuate engaging surface for engaging the tree, wherein forward-motion of the vehicle causes the tree to contact the engaging surface,
        the slidable member to slide towards the distal end of the supporting member due to contact with the tree, and
        the pivotable member to pivot towards the distal end of the supporting member, due to the coupling with the slidable member, and at least partially cross the engaging surface to cut the tree.

13. The tool of claim 12, further including a resistive element operable to resist the pivoting of the pivotable member and the sliding of the slidable member towards the distal end of the supporting member.

14. The tool of claim 13, wherein the resistive element is operable to return the pivotable member and the slidable member towards the proximate end of the supporting member.

15. The tool of claim 12, wherein the pivotable member includes a sharpened cutting edge to facilitate cutting the object.

16. The tool of claim 12, wherein the supporting member mounts to the vehicle utilizing a three-point linkage.

17. The tool of claim 12, wherein the vehicle is a tractor.

18. The tool of claim 12, wherein continues forward-motion of the vehicle enables a plurality of objects to be sequentially cut.

19. The tool of claim 12, wherein the crossing of the pivotable member and slidable member enables both the pivotable member and the slidable member to facilitate cutting the tree.

20. The tool of claim 12, where in the pivotable member is formed such that it does not cross the engaging surface until the slidable member is slid towards the distal end of the supporting member.

* * * * *